W. P. ALBERT.
TELEPHONE EXCHANGE SYSTEM.
APPLICATION FILED DEC. 16, 1912.

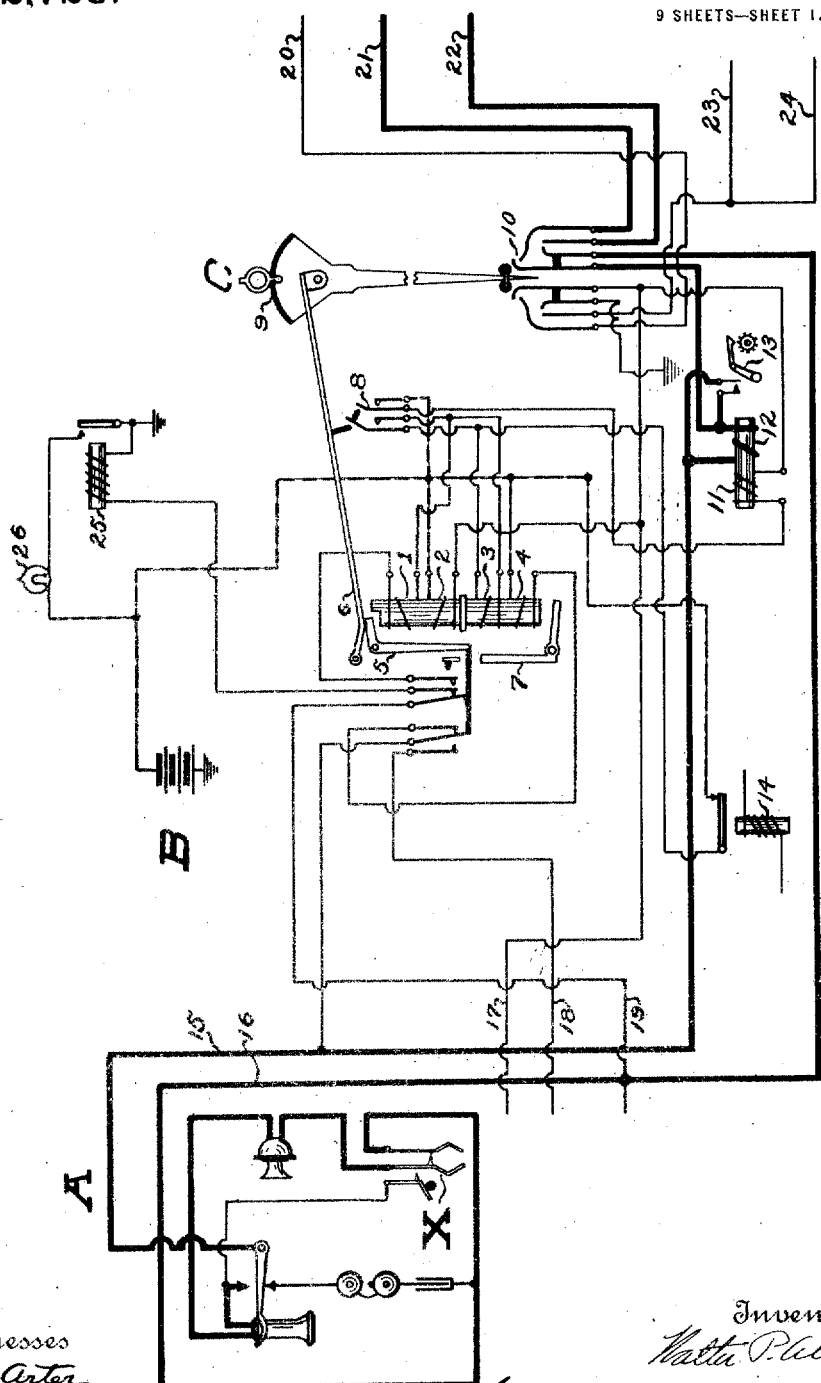

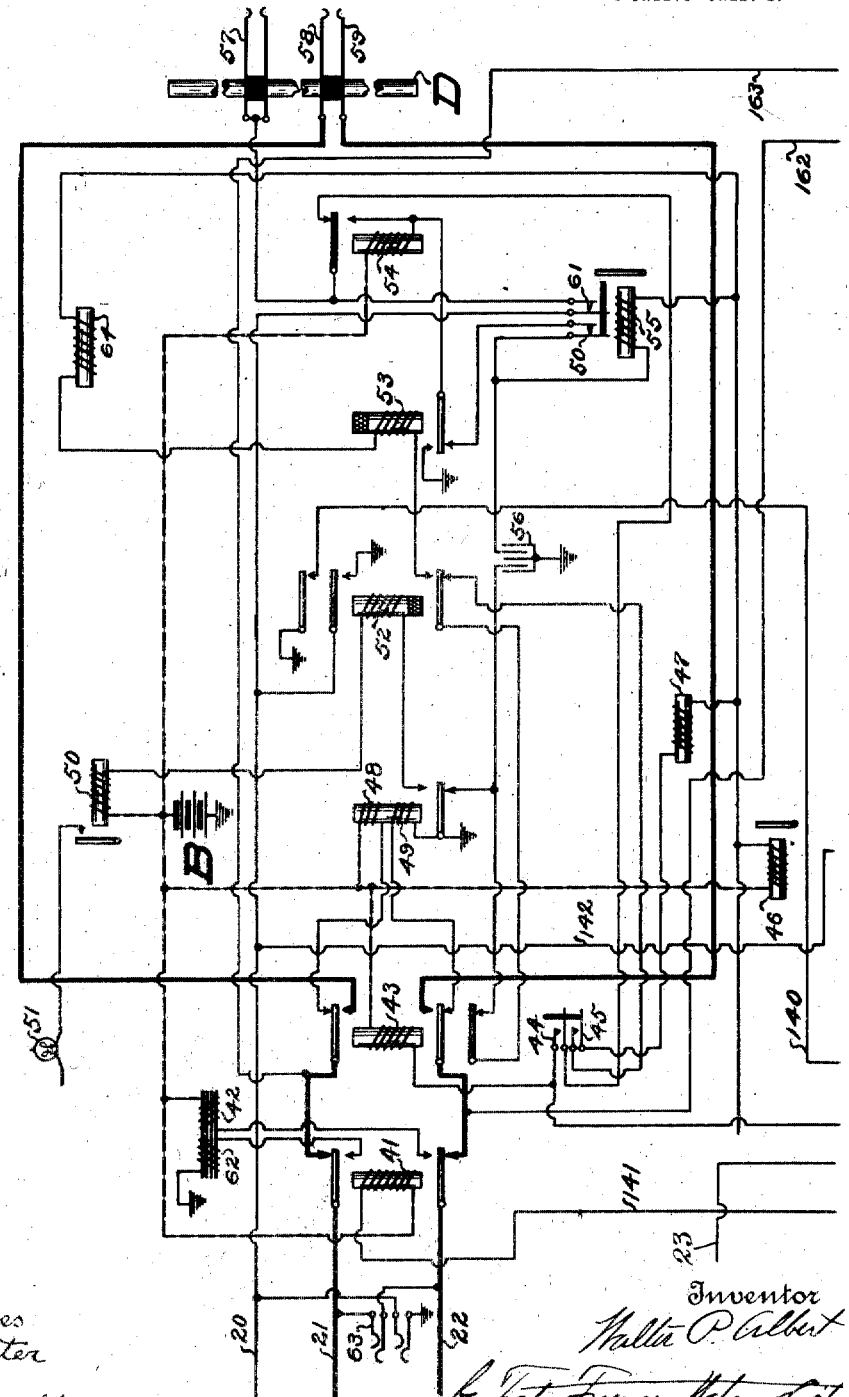

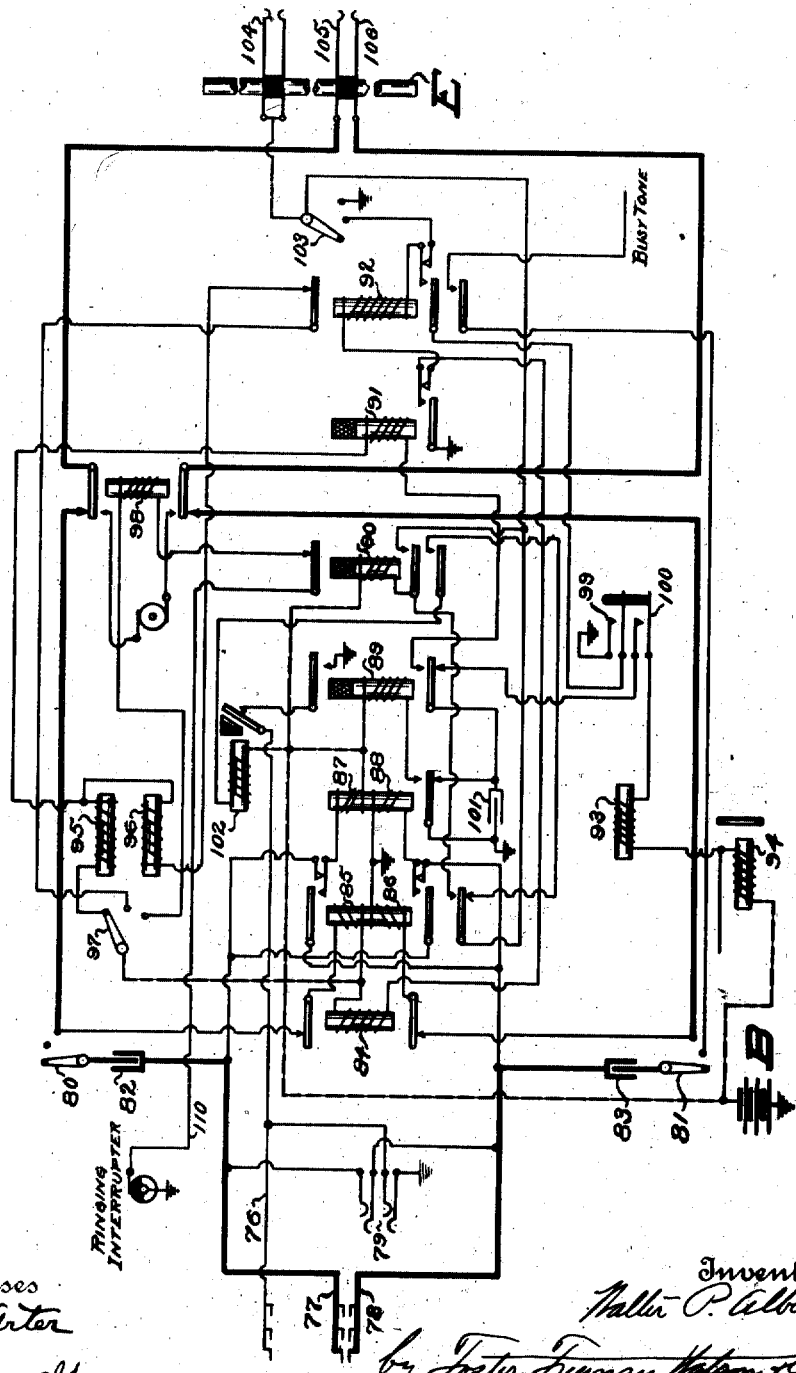

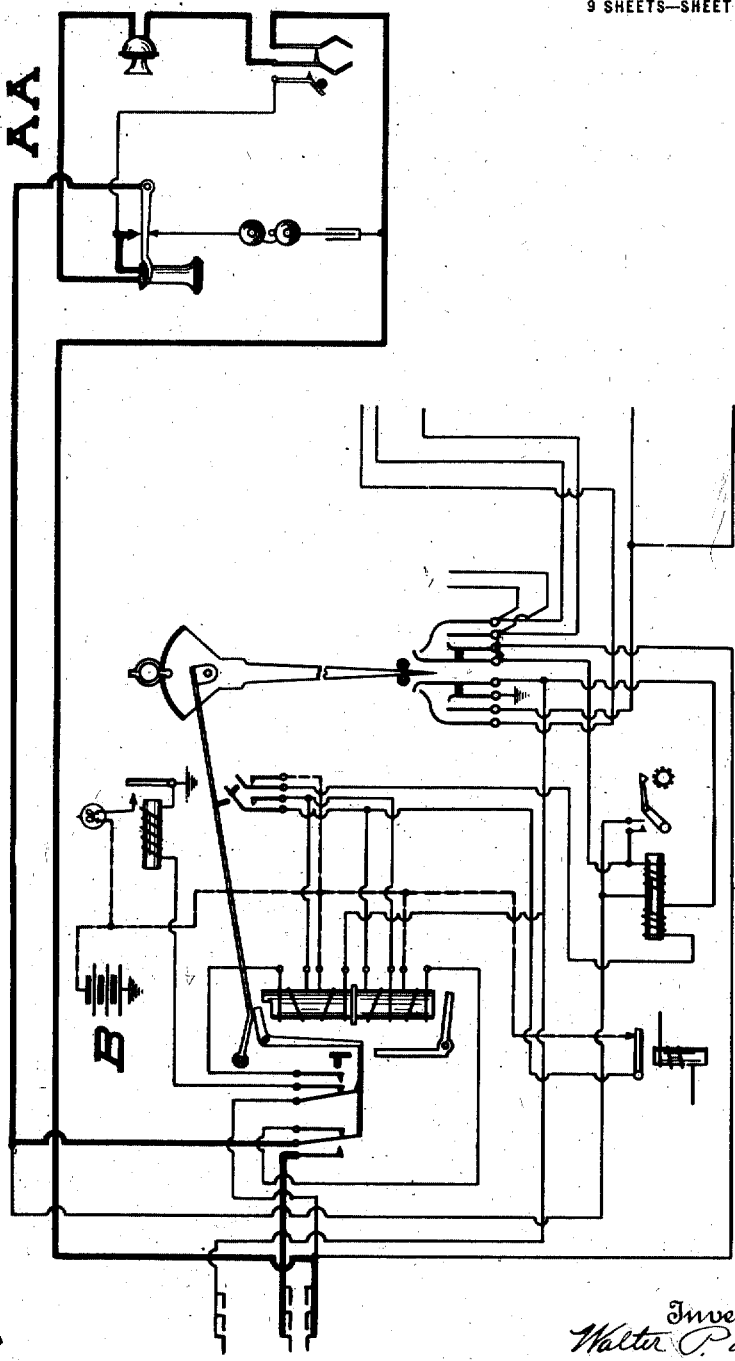

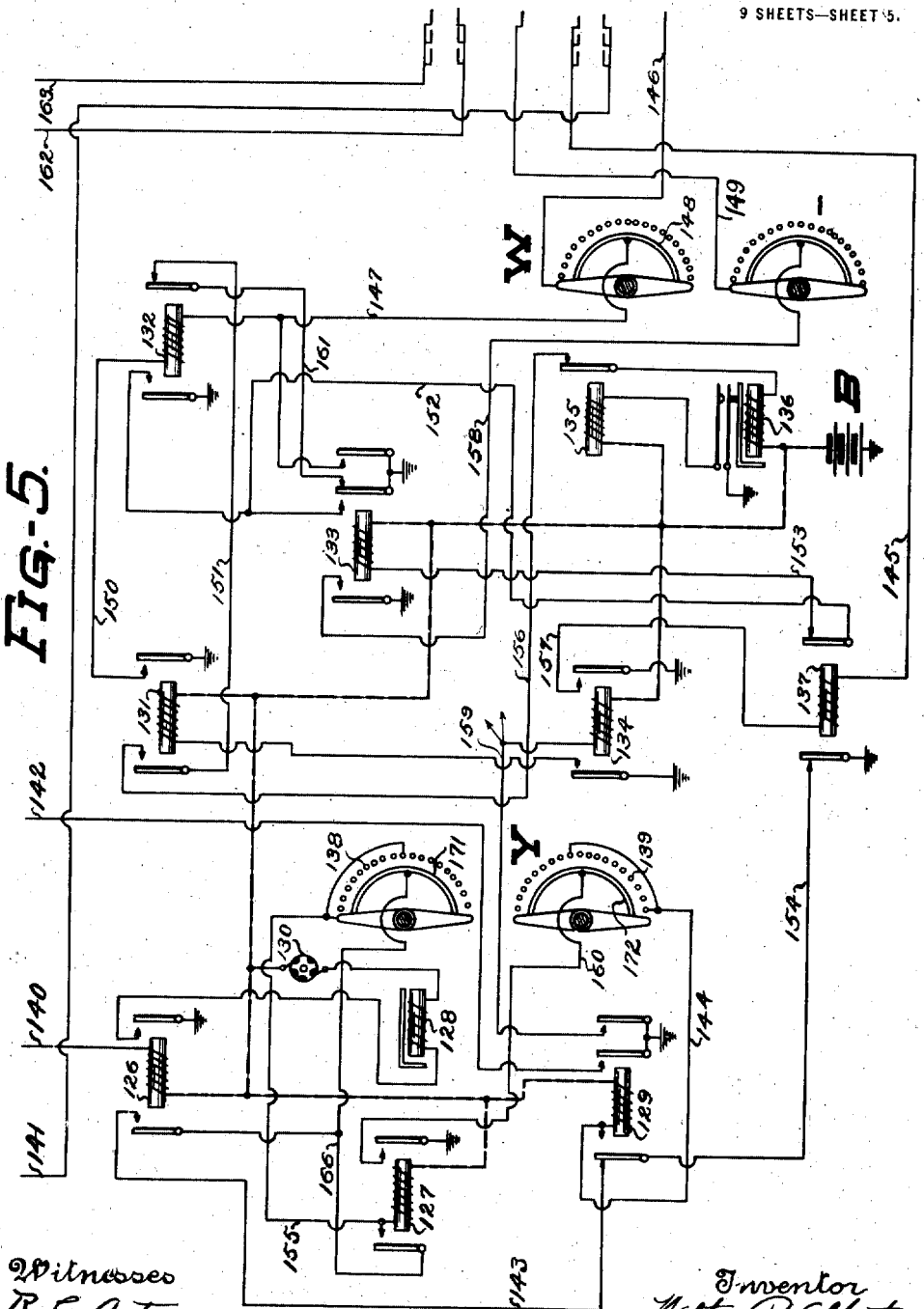

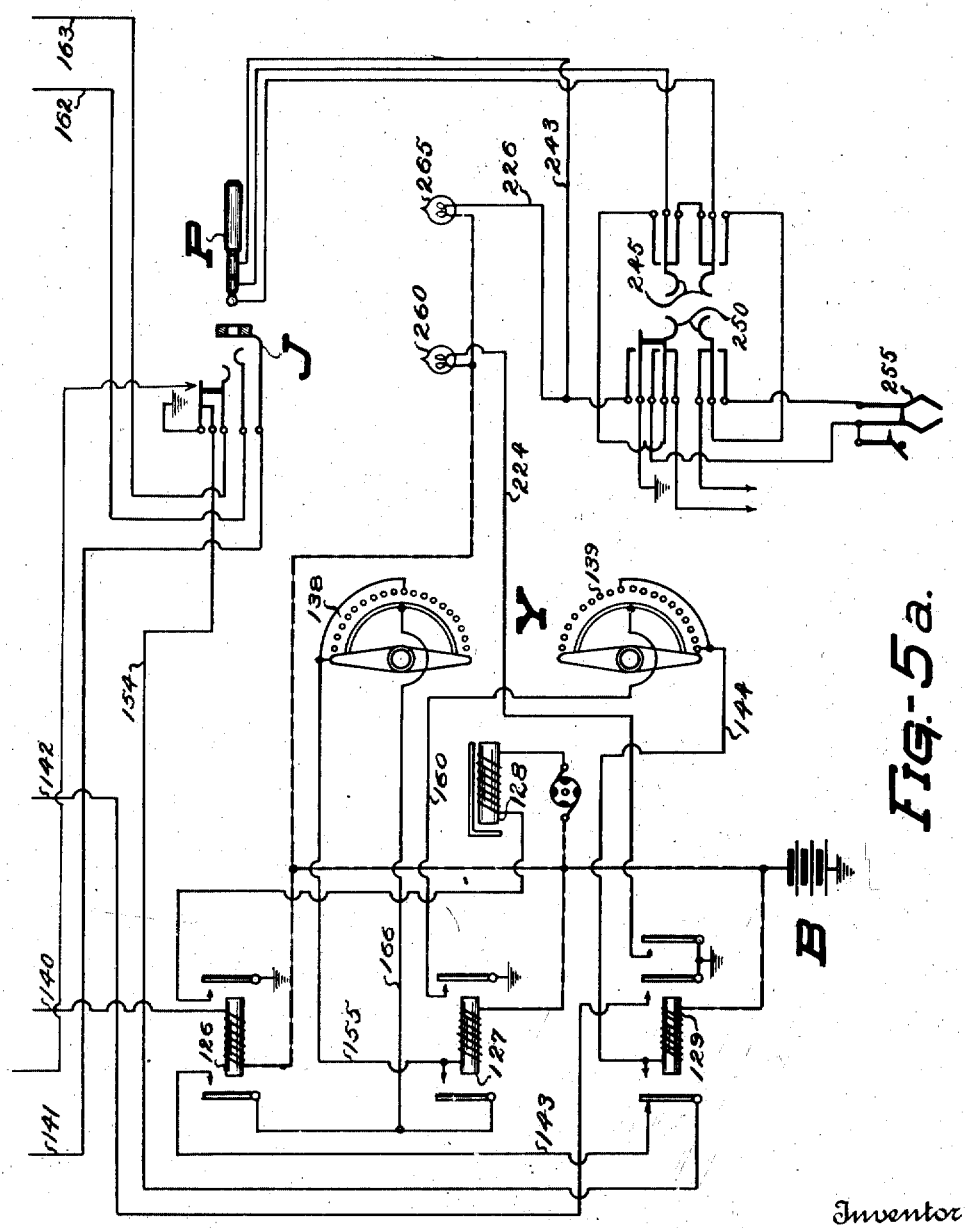

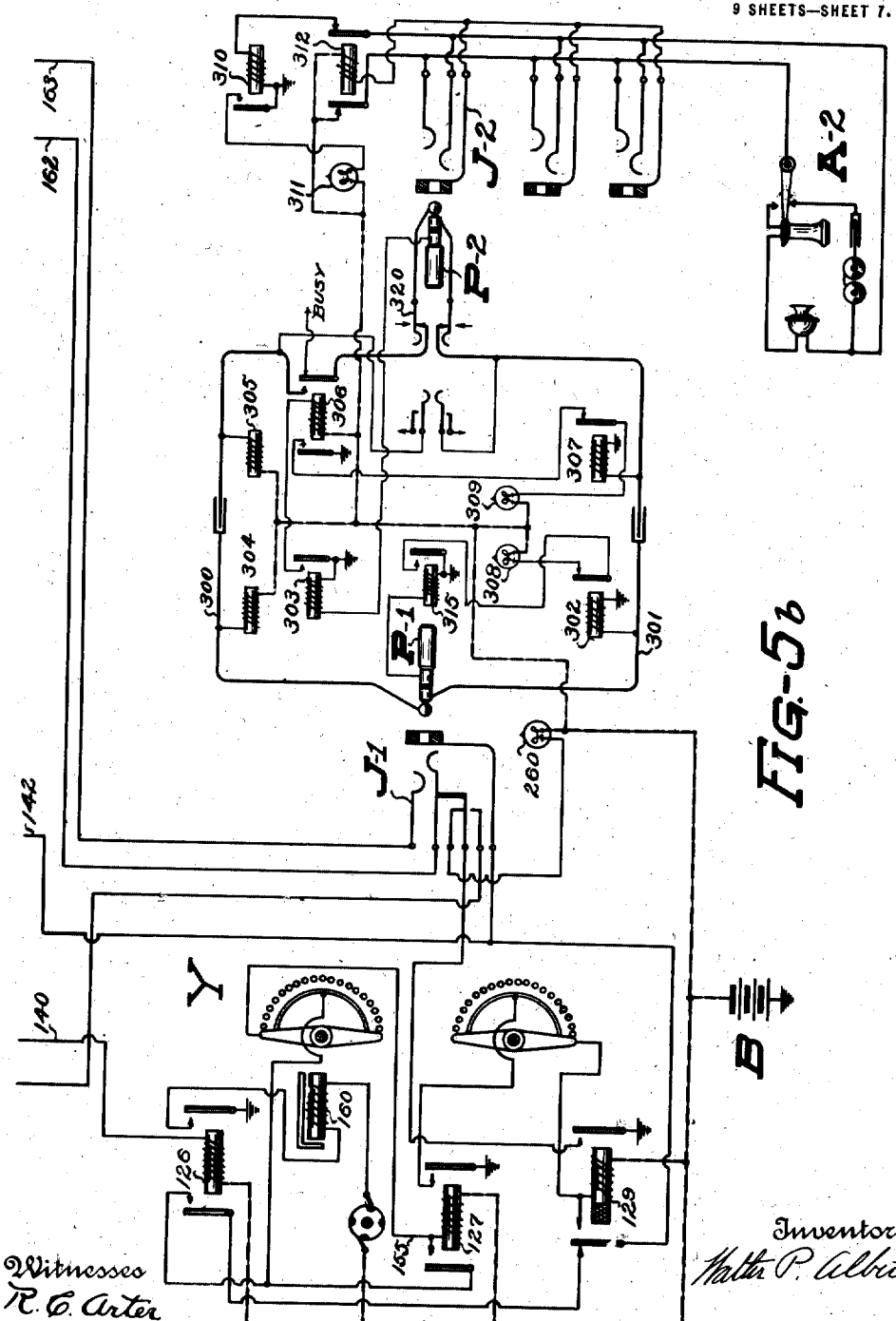

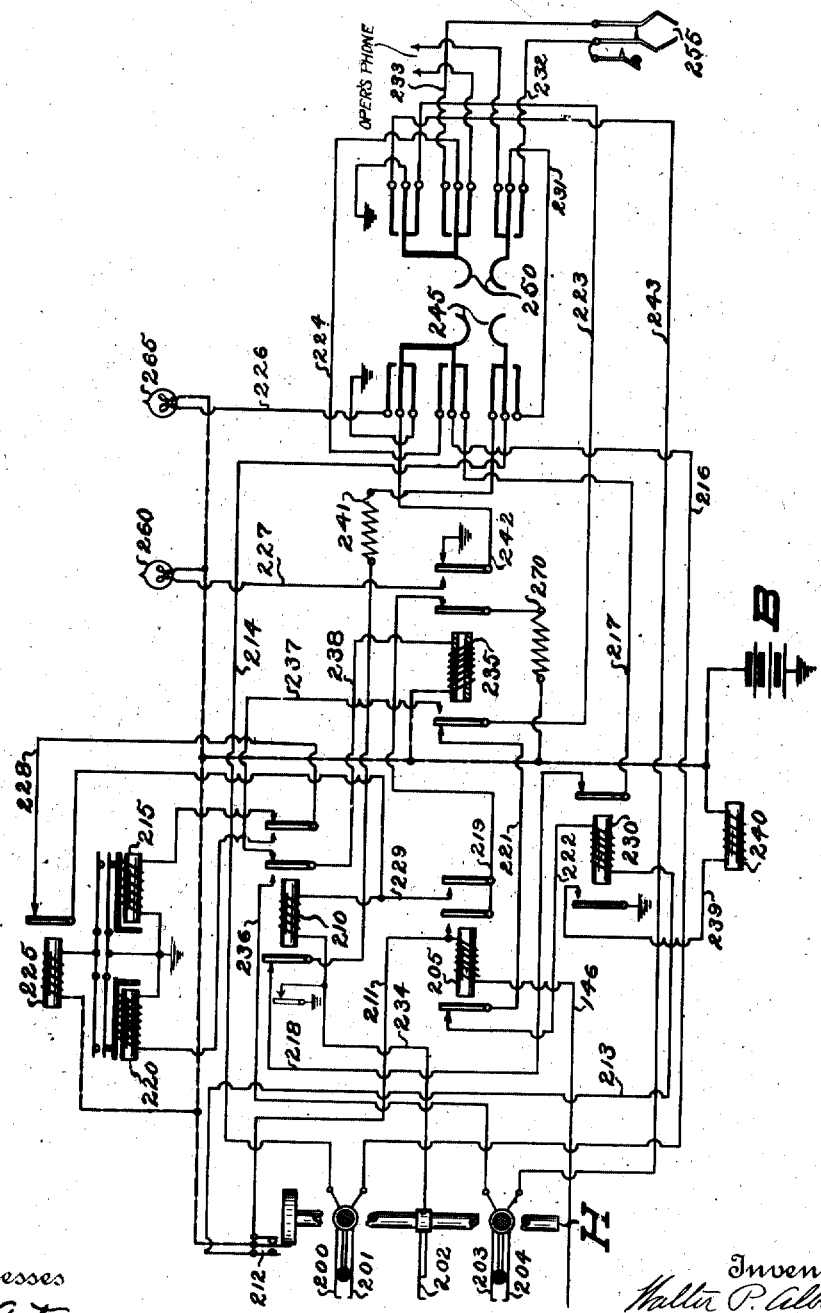

1,212,728.

Patented Jan. 16, 1917.
9 SHEETS—SHEET 9.

Witnesses
R. G. Arter
E. L. Greenwald

Inventor
Walter P. Albert
by Foster Freeman Watson & Girl
Attorneys

UNITED STATES PATENT OFFICE.

WALTER P. ALBERT, OF CHICAGO, ILLINOIS, ASSIGNOR, BY MESNE ASSIGNMENTS, TO JAMES R. GARFIELD, TRUSTEE, OF CLEVELAND, OHIO.

TELEPHONE-EXCHANGE SYSTEM.

1,212,728.      Specification of Letters Patent.    Patented Jan. 16, 1917.

Application filed December 16, 1912. Serial No. 737,100.

*To all whom it may concern:*

Be it known that I, WALTER P. ALBERT, a citizen of the United States, residing at Chicago, in the county of Cook and State of Illinois, have invented certain new and useful Improvements in Telephone-Exchange Systems, of which the following is a specification.

My invention relates to telephone exchange systems especially to that class wherein automatic switching mechanism is employed for effecting connections between subscribers.

My invention in particular relates to the combination of "automatic" and "manual" exchanges. I term as "automatic" an exchange where the subscribers' stations are equipped with dials or sending devices for operating the switching mechanism. By the term "manual" I mean an exchange wherein operators are employed to effect connections between the calling and called subscribers. The operator at the manual exchange can complete the connections through regular multiple jacks in the ordinary manner, or, by providing the operators with dials or sending devices, the connections can be completed by automatic switches.

In the present instance I have shown my invention in connection with what is known as a "two-wire automatic system." In systems of this class grounds at the subscribers' stations are dispensed with and the impulses transmitted by simply making and breaking the metallic circuit. At the automatic exchange, these impulses are regulated, or controlled, by means of quick and slow acting relays; the latter remaining unresponsive while the impulses are being transmitted.

I have shown my invention in connection with circuits of a two-wire automatic system as disclosed in the *"Post Office Electrical Engineers' Journal"* July 19, 1912, vol. 5, page 2, published by the Institution of Post Office Electrical Engineers of London, England. The circuits shown in this publication are of a type similar to those shown in English patent to Dicker, No. 1298, of 1910.

In systems where automatic and manual switch boards are operated in conjunction, it is often desirable for the subscriber in the automatic exchange to signal, or become connected with a manual switchboard.

One feature of my present invention is the manner in which an automatic subscriber becomes connected to a manual switch-board by simply removing his receiver, and without operating the sending device. The line is first automatically connected to a first selector switch through the medium of a suitable primary switch. This function is performed regardless of whether the subscriber wishes to operate his sending device, or whether he wishes to become connected to a manual exchange. After his line is connected to a first selector switch by means of the primary selector switch, then a secondary switch, after a delayed interval, automatically picks out the first selector switch. When this connection is effected, the operator at the manual switchboard is notified of the fact by means of suitable signals. This operator, according to the several modifications and provisions disclosed, can by a suitable sending device operate the automatic switches through the first selector to which she has access. Instead of being provided with a sending device, and by omitting the secondary switch, the first selector switches can be provided with suitable signaling devices and associated answering jacks located before the operators. Upon receiving the signal, the operator by means of an ordinary cord circuit, can complete the connection from the jack leading to the first selector switch to a multiple jack leading to the called subscriber's line.

My invention is illustrated in the accompanying drawings wherein:

Figure 1 shows a subscriber's line equipment terminating in a line or primary switch at the automatic exchange. Fig. 2 shows the circuits of a first selector switch. Fig. 3 shows the circuits of a connector switch. Fig. 4 shows the line or primary switch of a called subscriber's line. Fig. 5 shows a time element and control circuit by means of which the subscriber in the automatic exchange is connected to a manual exchange. Fig. 5ª shows the arrangement of the circuits where individual jacks and signals are provided for the first selectors. Fig. 5ᵇ shows the arrangement of the circuits for connecting the subscriber in the automatic exchange to another subscriber by means of multiple jacks. Fig. 6 shows the circuit of a secondary switch and the operator's switching key and control device. Fig. 7 shows the arrangement of the various figures when the secondary switch (Fig. 6) is used. Fig. 8 shows the arrangement of the various figures when the modification (Fig. 5ª) is used. Fig. 9 shows the arrangement of various figures when the modification (Fig. 5ᵇ) is used.

Referring now to Fig. 1, the subscriber's station at A is equipped with apparatus usual in common battery systems and in addition is provided with a suitable sending device shown at X for making and breaking the metallic line circuit and short-circuiting the talking circuit of the subscriber. The line wires from the subscriber's station terminate in a line or primary switch. Each subscriber's line has an individual line switch and one row of contacts for its particular use. The subscriber's line is multipled to the row of contacts. In ordinary practice there would be ten sets of contacts to the row so that the line can become connected to any one of ten first selectors. When the line switch is operated by the subscriber removing his receiver, the plunger enters an idle set of contacts and so connects his line to a first selector switch. Immediately after this connection is effected, the remaining plungers belonging to other subscribers' line switches, are shifted by means of a master switch and brought in line with the next idle first selector contacts. In the present instance I have not illustrated the master switch as it is fully described and disclosed in the publication, and English patent previously referred to. The line switch comprises a four coil relay, the coils being shown at 1, 2, 3, and 4. The line coil 4 is operated when the calling subscriber's receiver is removed and attracts the armature 7. The operation of this armature completes the circuit of coils 1 and 3. As soon as these windings are energized, both the armatures 5 and 6 are operated. The armature 5 disconnects the line coil 4. The action of the armature 6 causes the plunger to enter the bank and connect the calling subscriber to an idle first selector switch, such as shown in Fig. 2. At the end of the plunger stroke, the contacts 8 are made, thereby short-circuiting the holding coil 3, and the line coil armature 7 falls back, which opens the circuit of the pull-down coil 1. When the plunger of the line switch enters the bank connecting the calling line to the first selector switch, then the line relay containing the windings 48, 49 is energized. The operation of this relay closes the circuit of relay 52 which in turn connects ground to the trunk release wire 20, thereby rendering the first selector busy and also closing the circuit of the coil 2 of the line switch. The circuit of this coil being kept closed holds the plunger into a bank of contacts until the calling subscriber hangs up his receiver.

Referring to Fig. 2, the first selector switch is shown at D and its vertical motion is controlled by the action of the relay equipped with windings 48—49, this relay responding to impulses from the subscriber's station. The relays shown with a portion hatched are slow acting relays and do not respond to the quick makes and breaks at the subscriber's station. 64 is a vertical magnet and 55 a rotary magnet of the first selector switch while 47 is the release magnet. In this figure I have added a relay 41 and a battery supply retardation coil, provided with the windings 42 and 62 for supplying current to the calling subscriber when the operator is directing the movement of the switches. Relay 41 is energized at this period and opens the tip and sleeve conductors and connects the battery supply retardation coil across the calling end. The contacts 44 and 45 are closed at the first vertical step of the switch D.

Referring now to Fig. 3 the connector switch is shown at E. 95 is the vertical magnet; 96 the rotary magnet, and 93 the release magnet. 84 is the private magnet while the relay equipped with windings 85 and 86 is the back bridge relay. The line relay is equipped with windings 87 and 88 and responds to impulses from the subscriber's sending device. 89 is the back release relay for placing the release under control of the called subscriber. 89 is the release relay and 98 the ringing relay, operated intermittently to connect generator current to the called line. 90 is the relay for cutting off the ringing current after the called party answers. 92 is the busy relay for testing the condition of a called-for line. The contacts 99 and 100 are closed at the first vertical step of the switch E.

The side switches shown at 80, 81, 97, and 103 are operated in the manner usual with switches of the "Stronger" type, their stepping being controlled by the action of the private relay, or magnet.

Referring to Fig. 4 the circuits are the same as shown in Fig. 1, and need not be described.

Referring now to Fig. 5, the time element switch for causing an automatic subscriber to become connected so as to signal an operator after suitable interval, is shown at Y. This switch is equipped with two banks of contacts 138 and 139, the wipers of which are caused to step by the action of magnet 128, having its circuit interrupted by suitable commutator 130. This commutator can be so timed that the stepping of the switch Y can be regulated to step at any desired speed. Relay 126 is the starting relay energized when the calling subscriber becomes connected to a first selector switch. Relay 127 is energized when the wiper of the switch Y reaches a contact 138 which is rendered active or grounded by the action of relay 126. As soon as relay 127 becomes energized, then relay 129 has its circuit closed by the wiper of the switch Y, engaging a contact 139. Relay 129 cannot become energized unless relay 127 is operated and until the wiper of the switch Y takes a certain number of steps thereafter. The contacts 138 and 139 can be so wired that the switch Y after energizing relay 127 can step any number of times before energizing relay 129. Relay 129 is the starting relay for bringing into action a secondary switch H, shown in Fig. 6. The secondary switch is picked out by a rotary selecting switch shown at W, equipped with two banks of contacts 148 and 149. As soon as relay 129 becomes energized, a stepping magnet 136 of the switch W is brought into action and causes the switch to rotate in search of an idle secondary switch H. The contacts 149 of the switch W serve to render the row contact of the switch H active, or, in condition to be selected. Relay 134 is operated by relay 129 and connects ground to one terminal of relay 137, the other terminal being connected to individual test contacts in banks of the secondary switches H. 132 is the test relay which operates when an idle secondary switch is picked out and when so operated disconnects or opens the circuit of the stepping magnet 136 causing the switch W to come to rest with its wipers on contacts leading to an idle secondary switch. When relay 137 is operated upon the switch H reaching the individual contact to which it is connected, then relay 133 is deënergized causing ground to be removed from the row contact of the switch H. Wires 162—163 are connected to the tip and sleeve conductors of the first selector switch and terminate in the bank contacts of the switch H. The impulses are transmitted over these two wires to operate the various selector and connector switches.

Referring to Fig. 6, the secondary switch is shown at H. This switch is of a two-motion type. It first steps in a rotary direction to pick out the group in which the calling trunk is located, after which it steps vertically until the individual test contact with which the calling trunk is associated, is found. 202 is the row wiper which engages the row contacts while the switch is rotating. There is a single row contact for each group of ten individual contacts. In order for the switch to pick out the calling trunk, it first rotates to pick out the group of ten trunks in which the calling trunk is located, after which the switch steps vertically until the calling trunk in the group of ten is located. 210 is the row test relay connection to the row wiper 202. 235 is the individual test relay and operates when the wiper 203 engages an active contact. 205 is the starting relay for causing the switch H to step. This relay is energized as soon as the switch W picks out the idle switch H. 215 is the rotary magnet and 220 the vertical magnet. 225 is the interrupter relay for causing the automatic action or stepping of the vertical and rotary magnets. 260 is the signal lamp which is caused to light by the action of relay 235. 240 is the release magnet of the switch H which has its circuit controlled by the action of relay 230; this latter relay being energized or controlled by the operator. The operator's sending device, or dial, is shown at 255 and is connected to the tip and sleeve conductors when the key 250 is operated. When the key 245 is operated, the operator's telephone set is connected across the tip and sleeve conductors allowing her to converse with the calling subscriber. The action of this key extinguishes lamp 260, but at the same time causes lamp 265 to light. After the operator builds up the connection from the calling to the called subscriber, she restores both keys 245 and 250 to their normal position, thus restoring the secondary switch H preventing her listening to or interfering with the conversation.

Referring to Fig. 5ª, a modification of Figs. 5 and 6 is shown. In this modification, the secondary switch and the control switch W are dispensed with, and the wires from the first selector switches are now permanently connected to trunk jacks provided with suitable signal lamps located before operators. A control switch Y acting in the same manner as that in Fig. 5 connects the automatic subscriber's line after a delayed interval to the trunk jack, thus signaling the operator at the manual switchboard. The operator is provided with cord circuits, with associated keys, for answering the calling subscriber and for controlling the automatic switches.

Referring to Fig. 5ᵇ still another modification is shown wherein the first selector switches are connected to trunk jacks but instead of the operator being provided with a sending device for controlling the automatic switches, she is provided with pairs of cord circuits for effecting connections from the trunk jacks associated with the calling lines to multiple jacks leading to lines of called subscribers. The automatic subscribers' lines are connected after a suitable interval to the trunk jacks by means of the time element switch Y in the same manner as described in connection with Fig. 5.

Referring to Figs. 5, 6, 5ª and 5ᵇ, the time element switches Y are individual to a first selector switch Fig. 2. The switch W, (Fig. 5) can be common to a group of one hundred Y switches. The number of H switches depends upon the number of contacts in the switch W. If the switch W is provided with ten contacts, there will be ten H switches. These H switches can be distributed among a number of operators at the manual switchboard.

The grouping and number of switches provided can be arranged to suit conditions. Instead of forming the Y switches into groups of one hundred, they can be formed into smaller groups, each group controlling its own W switch.

I will now trace a call from the automatic subscriber A, who desires to signal a manual switch-board, and arrange the various circuits as shown in Fig. 7. The subscriber at A, removing his receiver closes the circuit of the line coil 4, thereby causing the armature 7 to become attracted. The action of this armature completes the circuits of coils 1 and 3, thereby causing the arms 5 and 6 to operate. The armature 5 operates a set of contact springs, and disconnects the line coil 4. The action of the armature 6 causes the plunger to enter the bank contacts and connect the calling subscriber to an idle first selector switch, as shown in Fig. 2. At the end of the plunger stroke, contacts 8 are operated, thereby short-circuiting coil 3, and the line coil armature 7 falls back, which opens the circuit of the coil 1.

When the plunger of the line switch enters the bank contacts, the calling line is connected to a first selector switch, thereby operating the line relay, provided with the windings 48 and 49. The operation of this line relay closes the circuit of relay 52 in series with relay 50. The operation of relay 52 connects ground to the release trunk wire 20, thereby completing the circuit of the winding 2 of the line switch relay, through the contacts of the bank 10. This ground also renders the first selector switch busy against other calls. The operation of relay 52 closes the circuit of relay 126, (Fig. 5) as follows: ground, 140, 126 to battery B. Relay 126 operating connects ground to the winding of the stepping magnet 128 which thereupon, under the influence of the commutator 130, causes the switch Y to step. The action of relay 126 also connects ground to the portion 171 of the switch Y as follows: ground, back contacts of relay 137, 154, back contacts of relay 129, 143, contacts of relay 126, 166, 171. The wiper of the switch Y connects the portion 171 to the contacts to which the wire 155 is connected. As soon as such a connection is effected, relay 127 is operated. The operation of this relay connects ground to the portion 172 of the switch Y and when the wiper of this portion reaches contact to which the wire 144 is connected, the circuit of relay 129 is closed. The operation of this relay opens the circuit of relay 127 by removing the ground from its locking contact. The operation of relay 129 closes the circuit of relay 134 and this latter relay in turn closes the circuit of relay 131. The operation of relay 131 completes the circuit of the stepping magnet 136 of the switch W as follows: battery B, 136, contacts of relay 135, 156, contacts of relay 131, 151, back contacts of relay 132, 161, back contacts of relay 133 to ground. The switch W will continue to rotate until an idle secondary switch is reached, whereupon the circuits of relays 205, 132 are completed as follows: ground, contacts of relay 131, 150, 132, 147, 148, 146, 205, 211, cam springs 212, to battery B. The operating of relay 132 opens the circuit of the stepping magnet 136 causing the switch W to cease rotating. The operation of relay 132 completes the circuit of relay 133, as follows: ground, contact of relay 132, 152, contacts of relay 137, 133 to battery B. The operating of relay 133 connects ground between the winding of relay 132, and relay 205, thereby shunting the former. The operation of relay 205, completes the circuit of the rotary magnet 215, as follows: battery B, coil 270, back contacts of relay 235, 219, contacts of relay 205, 229, contacts of relay 225, 228 back contacts of relay 210, 215 to ground. The operation of the rotary magnet causes the switch H to rotate until the wiper 202 engages the active row contact, whereupon the circuit of relay 210 is completed as follows: battery B, coil 270, back contacts of relay 235, 219, contacts of relay 205, 229, 210, 234, 202, 149, 158 to ground through the contacts of relay 133. The operating of relay 210 disconnects the rotary magnet and in its place connects the vertical magnet, causing the switch H to step vertically until the individual test contact is reached. As soon as this contact is found, the circuit of relay 235 is completed as follows: battery B, 235, 238, contacts of relay 210, 236, 203, 145, 137, 157, to ground, through the contacts of relay 134. The operation of relay 235 prevents further action of either the rotary, or vertical magnets of the switch H, thereby causing this switch to come to rest with its wipers engaging contacts leading to the calling trunk. Relay 235 also in acting, closes the circuit of the signal lamp 260 as follows: ground, contacts of key 245, 242, contacts of relay 235, 227, 260, to battery B.

The operation of relay 127 opens the circuit of relay 133 and this latter relay falling back removes the shunt from relay 132, and also removes ground from the row contact in the switch H. The operation of relay 137 also removes ground from the locking contact of relay 129, thereby unlocking it. This relay falling back unlocks relay 134, which in turn opens the circuit of relay 131, and also the circuit of relay 137. The circuit of relay 235 is maintained thereafter to ground through the contacts of key 250.

After relay 129, (Fig. 5) becomes energized, ground is connected to the trunk release wire 20 so as to hold the first selector switch busy in case the calling subscriber should hang up his receiver, after the switch Y performs its functions. The foregoing provisions is made so that the relay 129 of the switch Y when energized will cause the switch H to find the calling trunk, regardless of whether the calling subscriber hangs up his receiver or not.

If the subscriber had operated his dial before relay 129 became energized, then the line relay of the first selector switch (Fig. 2) would become disconnected after its work was completed. In this event, relay 52 would become deënergized and prevent any action of the switch Y.

The line relay (Fig. 2) is held energized after the secondary switch becomes connected to the calling trunk as follows: battery B, 48, contacts of relay 43, 163, 200, 214, contacts of key 245, coil 241, contacts of relay 210, 218, contacts of relay 230, 217 contacts of key 245, 216, 201, 162, contacts of relay 43, 49 to ground. The energizing of the line relay in this manner closes the circuit of relay 52 which in turn renders the trunk release wire 20, busy, after relay 129, (Fig. 5) falls back.

The operator after receiving the signal 260, operates key 245, thereby connecting her telephone set in place of the resistance coil 241. By means of the telephone set, the line relay (Fig. 2) is held energized. The operation of key 245 disconnects lamp 260, but causes lamp 265 to light instead. After conversing with the subscriber at the automatic exchange and finding that he wishes to converse with another subscriber in the automatic exchange, she operates the key 250, thereby disconnecting her telephone set and in its place connecting a suitable dial, or sending device 255. By operating this dial, she can complete the connection by means of the automatic switches in the same manner as though the connection were being built up by the subscriber operating his dial, or sending device. The operating of key 250 closes the circuit of relay 41, (Fig. 2) as follows: ground, contacts of key 250, 243, 204, 141, 41, to battery B. The operation of this relay severs the trunk conductors, but connects the retardation coil to the calling subscriber in place of the line relay. By severing the conductors the calling subscriber is prevented from hearing the impulses. The operator by manipulating the dial causes the line relay (Fig. 2) to respond to the impulses. At each operation of the line relay the circuit of the vertical magnet 64 is completed in series with relay 53 through the contacts of relays 43 and 52. At each break of the line relay, the vertical magnet is operated and the spindle carrying the wipers, steps vertically until the proper row of contacts is reached. Relay 52 will not fall back due to the makes and breaks caused by the action of the line relay. Relay 53 responds to the first impulse, and closes the circuit of relay 54, which locks itself to ground through the contacts 61 and the contacts of relay 52.

After the first group of impulses have been transmitted, the armature of relay 53 falls back, and the rotary magnet circuit is closed through the contacts 50, contacts of D, contacts 61, and contacts of relay 52. The rotary magnet 55 is now operated and the wipers move to pick out the first idle contact in the bank. The rotary armature of the rotary magnet breaks its own circuit at 50 and 61 momentarily, just before the private wiper 57 reaches the test contact. The ground at the contact of relay 52 is thus removed from the rotary magnet and the private wiper circuits and, if the trunk is engaged, the test contact will be grounded, and consequently the relay 54 remains energized. On the restoration of contacts 50 and 61, the rotary magnet will again be operated and so on, until an idle trunk is found. When such an idle trunk is found, the rotary magnet circuit is broken at the contacts 50 and 61 and the circuit of the private relay is broken. Its armature falls back, thereby disconnecting itself and the rotary magnet 55. As soon as contacts 50 and 61 are completed again the circuit of the line switching relay 43 is completed through the contacts 44, thereby removing the line relay from the trunk conductors.

The relay 52 is slow acting and holds the grounded contact long enough for the line switching relay 43 to be operated. The action of the line switching relay connects the calling subscriber's line through to the connector. The connector's line relay operates and closes the circuit of the release relay, which in turn connects ground to the release trunk wire and holds the first selector line switching relay 43 energized and also the bridge cut-off coil 2 of the line switch energized. The energizing of the line relay provided with the windings 87 and 88 completes the circuit of the release relay 89. The operation of this latter relay connects ground to the trunk release wire 76 thus rendering the connector busy against other calls. The operator now operating the calling device causes the line relay to respond according to the number of impulses transmitted. The operation of this relay closes the circuit of the vertical magnet 95 through the upper contacts of relay 89 in series with the series relay 91 and contacts of side switch 97. Relay 89 remains energized while the line relay is transmitting the impulses. It will be noted that the impulses for operating the vertical magnet are delivered when the line relay makes its back stroke. The operation of the vertical magnet 95 causes the spindle E carrying the wipers to step vertically and come opposite the row of contacts selected. The operation of the series relay 91 connects ground to the winding of the private relay 84. The line relay remaining energized for an appreciable length of time, after the impulses have been delivered, allows relays 91 and 84 to fall back. The private relay 84 falling back, causes the four side switches 80, 81, 97 and 103 to be shifted to the second contact by a mechanical operation. The operator now in operating the calling device the third time again operates the line relay which in turn completes the circuit of the rotary magnet 96 through the side switch 97, thereby causing the switch E to rotate and bring its wipers into engagement with contacts leading to the called line. Relays 91 and 84 are again energized. If the called line is busy, then when the series relay 91 falls back, the circuit of the private relay 84 will be closed through the contacts of relay 91 in series with the winding and contacts of the busy relay 92. The busy relay 92 operating locks both itself and the relay 84 through the off-normal contact springs 99, which were operated at the first vertical step of the switch E. The operation of the busy relay connects a suitable busy tone test to the calling subscriber through the second contact of the side switch 81.

The calling subscriber upon receiving the busy tone test hangs up his receiver thereby opening the line circuit and the line relay of the connector is deënergized and the release magnet 93 is energized through the off-normal cam springs 100, thereby causing the switch E to return to its normal position. If the caller-for line is idle, then the private relay circuit is broken and this relay in falling back causes the side switches to move to their third, or final position. The called subscriber's test contact is now grounded through the side switch 103, thereby rendering his line busy against other calls. This ground, besides rendering the line busy, operates the bridge cut-off relay at the called subscriber's line switch (Fig. 4). The armature corresponding to 5 (Fig. 1) is pulled down but the plunger is not affected.

After the connection is completed the ringing relay 98 is operated as follows: ground, ringing interrupter to wire 110, contacts of relay 90, 98, third contact of the side switch 97 to battery B. The action of the ringing interrupter causes the ringing relay to intermittently apply current to the called line. The subscriber removing his receiver during the non-ringing interval closes the circuit of the back bridge relay provided with the windings 85 and 86. The operation of this relay closes the circuit of the ring cut-off relay 90, which is operated and locked so as to prevent any further action of the ringing relay 98. The action of the back bridge relay also connects the windings 87 and 88 of the line relay to the tip and sleeve conductors in reverse order. Reversing the windings in this manner will operate a meter associated with the calling line.

Battery supply for the called subscriber is furnished through the back bridge relay coils and the condensers 82 and 83 are interposed between the calling and the called subscribers' lines.

When the calling subscriber hangs up his receiver, the release magnet 93 is operated as follows: ground, back contacts of relay 89, 100, 93, 94, to battery B. The operation of release magnet restores the switch E to its normal position. The falling back of the line relay releases the release relay 89 which in turn removes ground from the trunk release wire 76 thereby causing the switching relay 43, (Fig. 2) to fall back closing the circuit of the release magnet 47 through the off-normal contacts 45. The ground being removed from the trunk release wire 76 also opens the circuit of the bridge cut-off coil 2 of the line switch (Fig. 1) and the plunger is withdrawn from the bank. The bridge cut-off coil of the called subscriber is also deënergized releasing the armature corresponding to 7, (Fig. 1).

We have now described how the automatic subscriber becomes connected to a manual switch-board and also the method by which the operator controls the automatic switches. After the connection is established, or when all of the impulses have been transmitted, the operator restores the keys 245 and 250, thereby closing the circuit of the release relay 230 as follows:—ground, contacts of 250, 223, contacts of relay 235, 221, contacts of relay 205, 222, 230, cam springs 212 to battery B. The action of release relay closes the circuit of the release magnet 240, thereby restoring the switch H to its normal position. The action of relay 230 also opens the loop formed by the wires 162 and 163, which join the tip and sleeve conductors of the first selector switch (Fig. 2). The restoring of the key 250 opens the circuit of relay 41 (Fig. 2) thereby removing the battery supply retardation coil and connecting the calling subscriber to the tip and sleeve conductors of the trunk.

Referring to the modification shown in Fig. 5ª, the automatic subscriber is connected to the first selector switch (Fig. 2) in the manner previously described. After this selection is made the time element switch Y is brought into action and the relay 129 operated as in Fig. 5. The action of this relay connects ground to the signal lamp 260. The lighting of this lamp notifies the operator of a call and she places the plug P into the jack J associated with the signal lamp. The wires 162 and 163 leading to the tip and sleeve conductors respectively of the first selector switch are connected to the jack J. After the plug P is placed into the jack J, ground is removed from the locking contact of relay 129, thereby releasing it and extinguishing the lamp 260. The operator by operating the key 245 connects her telephone set across the tip and sleeve conductors allowing her to converse with the calling subscriber. After getting the desired number she operates key 250, thereby disconnecting her telephone set and in its place, connecting the dial or sending device 255. The operation of key 250 connects ground to the wire 243 causing the lamp 265 to light, and also closes the circuit of the additional relay 41, (Fig. 2). The operation of this relay severs the tip and sleeve conductors and connects battery supply retardation coil to the calling subscriber's line. The method of operating the automatic switches is just the same as previously described. After all of the impulses have been transmitted the operator withdraws the plug P from the jack J, thereby releasing relay 41 (Fig. 2) so as to connect the calling subscriber to the tip and sleeve conductors of the trunk. It will be noted that in this modification, the operator at the manual switch-board can at any time place the plug P into an idle trunk jack J and signal any subscriber in the automatic exchange and hold the first selector trunk busy against incoming calls. The trunk is held busy by ground being connected to wire 23 (Fig. 1) by contact of the jack J when the plug is inserted.

Referring to the modification shown in Fig. 5$^b$, the automatic subscriber is connected to the jack $J^1$ in the same manner as to jack J in Fig. 5$^a$. The operation of relay 129, which in this instance is a slow acting relay, lights the lamp 260 through the normally closed contacts of the jack $J^1$. The operator upon getting the signal places the plug $P^1$ into the jack $J^1$, thereby extinguishing lamp 260. The locking circuit of relay 129 is maintained through relay 315, which is connected to the third conductor of the plug $P^1$. Relay 43 (Fig. 2) also has its circuit maintained through the contacts of jack $J^1$ thereby disconnecting relay 48—49. The operator finding that the subscriber in the automatic exchange desires to converse with a subscriber in the manual exchange, places the plug $P^2$ into one of the multiple jacks $J^2$ of the called line. The operator first tests to see whether the called-for line is busy, the test being performed in the regular manner, through the tip of the plug and the sleeve or thimble of the jack. If the called-for line is not busy the operator rings by throwing forward the key 320, thereby connecting generator current to the called line. When the plug $P^2$ is placed in the jack $J^2$ relay 303 is placed in series with the cut-off relay 312 of the called line. The operation of relay 312 disconnects the line relay 310. The operation of relay 303 closes the circuit of relay 306. The operation of this latter relay completes the tip conductor of the cord and disconnects the busy terminal. The operation of relay 306 also closes the circuit of the supervisory lamp 309 through the back contacts of relay 307. Relay 307 and retardation coil 305, connected respectively to the grounded and free side of battery, furnish talking current to the called subscribers in the manual exchange. The coil 304 and relay 302 connected respectively to the free and grounded side of battery supply current to the calling subscriber. When the called subscriber answers, relay 307 is energized, thereby extinguishing the supervisory lamp 309 notifying the operator that he has answered. At the end of the conversation the called subscriber hanging up his receiver allows relay 307 to fall back lighting lamp 309 which notifies the operator that he has hung up his receiver. The automatic subscriber upon hanging up his receiver, releases the relay 302, thereby lighting the lamp 308, notifying the operator that his receiver is hung up. The operator upon getting these two disconnect signals removes the plug $P^2$ from the jack $J^2$ and the plug $P^1$ from the jack $J^1$. The removal of the plug $P^1$ allows relays 129 (Fig. 5$^b$) and 43 (Fig. 2) to fall back. The circuit of holding winding 2 (Fig. 1) is also opened allowing the plunger of the line switch to leave the bank of contacts, thereby restoring all parts of the line switch to their normal condition.

From the modification shown in Figs. 5, 5$^a$, and 6, it will be noted that the automatic system can readily be turned into what is known as a semi-automatic system, by simply removing the sending devices at the subscribers' stations, or allowing them to call as in manual exchanges.

By providing enough secondary switches H, and distributing them among a force of operators, it will be possible to operate the equipment at the central office end of the automatic exchange without any effort on the part of the subscribers, other than the removal of the receivers. If this method were carried out, the time element switch Y could be arranged to operate quickly so as to prevent loss of time. The timing of the time element switch Y now is regulated by the average time it takes a subscriber to start operating his dial after removing his receiver, so as to cut off the line relay 48—49

(Fig. 2). This line relay becomes energized as soon as the line switch connects the calling line to the first selector and remains energized, or active, until after the first group of impulses have been sent. After these impulses are sent, this relay is cut off by the action of relay 43.

I claim—

1. In a telephone exchange system, the combination of a calling and a called subscriber's station, said calling station being equipped with sending means, automatic switches adapted to be controlled by such sending means for establishing a connection between the calling and called lines, an operator's position, means responsive to the initiation of a call to connect the calling line to such operator's position, and means controlled by the operation of such sending means to prevent the operation of such connecting means.

2. In a telephone exchange system, the combination of a calling and a called subscriber's station, said calling station being equipped with a sending device and the usual switchhook, automatic switches adapted to be controlled by such sending means for establishing a connection between the calling and called lines, an operator's position, means responsive to the operation of the switchhook to connect the calling line to such operator's position, means controlled by the subsequent operation of the sending device to prevent the operation of such connecting means.

3. In a telephone exchange system, in combination, a calling and a called subscriber's station, automatic switching mechanism, line circuits from said stations terminating in the automatic switching mechanism, means at the calling station for closing a line circuit, a sending device at each station for operating the switching mechanism to interconnect the line circuits, an operator's position, means for connecting the calling line to the operator's position after the line circuit is closed and on a failure to operate said sending device at the calling station, and means accessible to the operator for completing the connection from the calling to the called subscriber.

4. In a telephone exchange system the combination of, subscribers' lines, impulse-sending means associated with certain of said lines, an operator's position and means for connecting the lines to the operator's position comprising automatic switching mechanism arranged to be rendered active upon origination of a call on one of said lines and on a failure to operate the impulse sending means associated with the line calling and additional means under control of the operator for interconnecting said lines.

5. In a telephone exchange system the combination of calling and called subscribers' lines and stations, impulse sending means associated with the lines and adapted to be actuated by the subscribers, an operator's position and means for connecting a calling subscriber's line to the operator's position comprising special automatic switching mechanism, means for rendering the special automatic switching mechanism active after an interval and upon a failure of the calling subscriber to operate the sending means associated with the calling line, a signal at the operator's position adapted to indicate when a calling subscriber's line becomes connected to the operator's position, and means whereby the operator may complete the connection from the calling to the called subscriber and release the special automatic switching mechanism.

6. In a telephone exchange system the combination of calling and called subscribers' lines and stations associated therewith, impulse sending means at the stations and accessible to the subscribers, automatic switching mechanism including selector and connector switches responsive to the sending means for interconnecting the lines, an operator's position, a secondary automatic switch associated with the operator's position and special automatic switching mechanism rendered active upon initiation of a call by a calling subscriber and upon failure of the calling subscriber to operate the sending means, adapted to actuate said secondary automatic switch to connect the calling subscriber's line with the secondary switch, a signal at the operator's position rendered active when the calling subscriber's line becomes connected to the secondary switch, and means accessible to the operator for completing the connection from the calling to the wanted subscriber upon the designation of the latter by the calling subscriber.

7. In a telephone exchange system the combination of a calling and a called subscriber's station, sending means associated with each station, automatic switching mechanism for interconnecting the stations and responsive to the sending devices, an operator's position, and means for connecting a calling subscriber's station to said operator's position upon the origination of a call and a failure to operate the sending means at the calling station comprising, a special automatic switch including banks of contacts, step-by-step actuating means therefor, and means associated with said special switch for connecting the operator's position to the calling line after a predetermined number of steps have been taken by said special switch.

8. In a telephone exchange system the combination of subscribers' lines and stations, sending means associated with certain of said lines, an operator's position and means for connecting a calling line to the operator's position upon the origination of a call and failure to operate the sending means at the station comprising a special step-by-step switch having banks of contacts associated therewith, and means operable after the step-by-step switch has been moved a predetermined number of steps for connecting the calling subscriber's line with the operator's position, and means accessible to the operator for completing the connection from the calling to the called subscriber.

9. In a telephone exchange system the combination of subscribers' lines and stations, sending means at certain of the stations, an operator's position including signals, and means operable on initiation of a call and on failure of the calling subscriber to operate the sending means at his station, for connecting the calling subscriber to the operator's position comprising secondary automatic switches, means for selecting an idle secondary switch, means for rendering said selecting means operative at the end of a predetermined interval after the call has been initiated, and means accessible to the operator for completing the connection from the calling to the called subscriber.

10. In a telephone exchange system the combination of subscribers' lines and stations associated therewith, impulse sending means at certain of the stations, an operator's position, means for connecting a calling subscriber's line to the operator's position after the lapse of an interval of time from the initiation of a call at a subscriber's station having a sending device associated therewith and upon failure of the subscriber to operate his sending device, and means including automatic switching mechanism and means for directing the action thereof at the operator's position for completing the connection from the calling to the called subscriber.

11. In a telephone exchange system the combination of calling and called subscribers' lines and stations, of automatic switching mechanism in which said lines terminate, means for sending impulses at certain of the stations, means at each station for initiating a call including the usual receiver and hook therefor, an operator's position including a telephone set and means for connecting a calling line to the operator's position and telephone set after the lapse of an interval of time after the subscriber's receiver is removed from its hook and upon failure of the subscriber to operate the impulse sending means at his station including a secondary automatic switch, means for operating the automatic switching mechanism for completing the connection from the calling to the called subscriber including a sending means at the operator's position, and means for restoring the secondary switch after the operation of the automatic switching mechanism.

12. In a telephone exchange system the combination of calling and called subscribers' lines and stations, impulse sending means at the stations, automatic switching mechanism responsive to said sending means for interconnecting the stations, an operator's position including a telephone set, means for connecting a calling line and station to the operator's position and telephone set upon the origination of a call and of a failure to operate the sending means at the calling station, means for connecting talking current to the calling subscriber's line, and means at the operator's position for controlling the completion of the connection from the calling to the called subscriber's station.

13. In a telephone exchange system the combination of calling and called subscribers' lines and stations, impulse sending means at certain of the stations, automatic switching mechanism responsive to the impulse sending means for interconnecting the subscribers' stations, an operator's position, means for connecting one of said calling subscribers' stations having a sending means associated therewith to said operator's position upon origination of a call and upon a failure to operate the sending means including a secondary automatic switch and means for actuating said secondary switch after the lapse of an interval of time from the initiation of a call, means for connecting talking current to the calling subscriber's line when said secondary switch is actuated, and means at the operator's position for directing the trunk switching mechanism to interconnect the calling and the called subscribers' lines.

14. In a telephone exchange system the combination of calling and called subscribers' lines and stations, impulse sending means at the stations, automatic switching mechanism responsive to said sending means for interconnecting the lines and stations, an operator's position, and means for connecting a calling subscriber's station to said operator's position comprising secondary automatic switches associated with the operator's position, means for selecting an idle secondary switch and rendering the same operative, and a special switch for actuating the selecting means, said special switch being rendered active upon the initiation of a call and arranged to actuate the selecting means after the lapse of an interval of time from the initiation of a call and upon failure of the calling subscriber to operate the sending device at his station, and means accessible to the operator for completing the connection from the calling to the called subscriber.

15. In a telephone exchange system the combination of calling and called subscribers' lines and stations, impulse sending devices at the stations, automatic switching mechanism responsive to said sending devices for interconnecting the lines and stations, an operator's position having a signal and a telephone set associated therewith, means for connecting a calling subscriber's station to the operator's position and operating the signal comprising secondary switches associated with the operator's position, means for selecting an idle secondary switch and rendering the same operative, and a special automatic switch actuated upon the initiation of a call and arranged to render said selecting means operative after the lapse of an interval of time from the initiation of a call, means for establishing communication between the operator and the calling subscriber, and means accessible to the operator for directing the action of the automatic switching mechanism to connect the calling subscriber's line with the wanted line and station.

16. In a telephone exchange system, the combination of calling and wanted subscribers' stations and lines, impulse sending means at a calling subscriber's station, an operator's position, means for connecting a calling line to the operator's position after the lapse of an interval of time from the initiation of a call and upon the failure of the calling subscriber to operate the sending device at his station, means controlled by the operator for completing the connection from the calling to the wanted subscriber and signaling the latter, and means for severing the calling line from the operator's position while transmitting signals to the wanted subscriber's station.

17. In a telephone exchange system the combination of a calling subscriber's line and station, a called subscriber's line and station, an impulse sending device at the calling subscriber's station, an operator's position, an automatic switch, a relay for starting the operation of the automatic switch upon the initiation of a call, and means including a relay rendered operative after said switch has operated for an interval of time from the initiation of the call and upon failure of the subscriber to operate the sending device, for connecting the calling line to the operator's position, and means controlled by the operator for completing the connection from the calling to the called subscriber.

18. In a telephone exchange system the combination of calling and called subscribers' lines and stations, impulse sending means at certain of the stations, automatic switching mechanism responsive to said sending means for interconnecting certain lines and stations, an operator's position including signals, keys and a telephone set, means for connecting a calling line having an impulse sending means associated therewith to the operator's position, said connecting means comprising secondary switches, means for selecting an idle secondary switch a special switch, a relay for starting said special switch upon the initiation of a call and a second relay rendered operative for actuating said selecting means after the lapse of an interval of time from the initiation of a call and upon failure of the calling subscriber to operate the sending means at his station, one of said signals being actuated when the calling line is connected to the operator's position and disabled and another signal actuated when one of said keys is operated, and a sending means arranged to be connected by another key to operate the automatic switching mechanism and connect the calling line with the wanted line.

19. In a telephone exchange system the combination of subscribers' lines and stations, impulse sending means at the stations, automatic switching mechanism responsive to said impulse sending means for interconnecting the lines and stations, an operator's position, means for connecting a calling subscriber's line to the operator's position including secondary automatic switches, means for selecting an idle secondary automatic switch and actuating the same, a special switch, electro-magnetic means for starting and operating the special switch upon initiation of a call at one of said stations, means for rendering the selecting means operative after the lapse of an interval of time from the initiation of a call and upon failure of the calling subscriber to operate the sending device at his station, means for disabling the special switch and selecting means when an idle secondary switch has been connected to the calling line, means accessible to the operator for completing connection from the calling to the called subscriber, and means for restoring the secondary switch to normal position after the completion of the connection.

20. In a telephone exchange system the combination of subscribers' calling and called lines and stations, impulse sending means at certain of said stations, an operator's position, means for connecting a calling subscriber's line which has a sending means associated therewith, to said operator's position comprising an automatic switch, means for starting the operation of said automatic switch upon the initiation of a call at a station having a sending means associated therewith, and means associated with said switch and operable after the lapse of an interval of time from the initiation of a call and upon failure of the subscriber to operate the sending device at his station for indicating to the operator that the subscriber calling desires to communicate with the operator, and means controlled by the operator for completing the connection from the calling subscriber to the subscriber's line and station desired.

21. In a telephone exchange system the combination of a calling subscriber's line and station, a called subscriber's line and station, an impulse sending device at the calling subscriber's station, an operator's position, a trunk line terminating at the operator's position, and means for connecting the calling subscriber's line to the trunk line comprising a special switch rendered operative upon the origination of a call, and means at the operator's position for completing the connection from the calling subscriber's station to the wanted or called subscriber's station.

22. In a telephone exchange system the combination of a calling subscriber's line and station equipped with an impulse sending means, a called subscriber's line, an operator's position, a trunk line terminating at the operator's position, an automatic switch for interconnecting the calling line with said trunk line, means for starting and operating the automatic switch upon the initiation of a call at the calling subscriber's station, and means rendered active after the lapse of an interval of time from the initiation of a call and upon failure of the subscriber to operate the sending device at his station for indicating to the operator that a calling subscriber is waiting to communicate with the operator, means for connecting the calling line to the trunk and to the operator's position, and means at the operator's position for completing the connection between the calling and called subscribers' stations.

23. In a telephone exchange system the combination of a calling subscriber's line and station equipped with impulse sending means, a wanted subscriber's line and station, an operator's position equipped with circuit make and break means, a trunk line adapted to be connected to the calling subscriber's line and terminating at the operator's position, signaling means actuated after a lapse of an interval of time from the initiation of a call at the calling subscriber's station and upon failure of the subscriber to operate the sending device at his station for indicating that the calling subscriber desires to communicate with the operator, and means under control of the operator for completing the connection from the calling to the called subscriber's line.

24. In a telephone exchange system the combination of a calling subscriber's line and station equipped with an impulse sending means, a called subscriber's station, automatic switching mechanism responsive to the sending means for interconnecting the lines and stations, an operator's position provided with a control circuit and associated keys, a trunk line adapted to be connected to a calling subscriber's line and terminating at the operator's position, a special automatic switch for interconnecting the calling line with said trunk line, means for starting and operating said special switch upon initiation of a call at the calling subscriber's station, and means for indicating that the calling subscriber desires to communicate with the operator, said indicating means rendered operative after the lapse of an interval of time from the initiation of a call and upon failure of the calling subscriber to operate the sending device at his station, and means including a sending device arranged to be connected to the trunk lines for directing the action of the automatic switching mechanism and completing the connection from the calling to the called subscriber's line.

25. In a telephone exchange system the combination of a calling subscriber's line equipped with impulse sending means, a called subscriber's line equipped with impulse sending means, automatic switching mechanism responsive to said impulse sending means for interconnecting the lines, an operator's position provided with telephone set and associated keys for answering the calling subscriber and controlling the automatic switching mechanism, a trunk line adapted to be connected to the calling subscriber's line and terminating at the operator's position, means for connecting the calling line to said trunk line, and indicating means at the operator's position rendered active after the lapse of a predetermined interval of time from the initiation of a call and upon failure of the calling subscriber to operate the sending means at his station, and impulse sending means arranged to be controlled by the operator to direct the action of the automatic switching mechanism when the line wanted is designated.

26. In a telephone exchange system the combination of a calling subscriber's line provided with impulse sending means, an operator's position, a trunk line adapted to be connected to the calling subscriber's line and terminating at the operator's position, other subscribers' lines, connecting means under the control of the operator for interconnecting the calling subscriber's station to said operator's position upon the origination of a call and upon failure of the calling subscriber to operate the sending means at his station.

27. In a telephone exchange system the combination of a calling subscriber's line and station equipped with impulse sending means, an operator's position provided with a control circuit, a trunk line adapted to be connected to the calling subscriber's line terminating at the operator's position, another subscriber's line, said control circuit being arranged for causing the interconnection of these lines, and means for indicating that the calling subscriber wishes to communicate with the operator, said indicating means being actuated after the lapse of an interval of time from the initiation of a call at the subscriber's station and upon failure of the subscriber to operate the sending device at his station.

28. In a telephone exchange system the combination of a calling subscriber's line provided with impulse sending means, an operator's position, a trunk line adapted to be connected to the calling subscriber's line and terminating at the operator's position, other subscriber's lines, a suitable control circuit for causing the interconnection of the calling subscriber's line with the other lines, means for connecting the calling subscriber's line to the trunk line comprising a special automatic switch, means for actuating the special automatic switch upon the initiation of a call, indicating means for notifying the operator that the calling subscriber wishes to be connected to one of said other lines, and means for actuating the indicating means after a predetermined operation of said switch and upon the failure of the calling subscriber to operate the sending device at his station.

29. In a telephone exchange system, the combination of a calling subscriber's line equipped with impulse sending means, an operator's position, a called or wanted subscriber's line, means for associating the calling subscriber's line and station with said operator's position upon the initiation of a call and upon failure of the calling subscriber to operate the sending device at his station, means controlled by the operator for connecting the calling line to the wanted line and station and signaling the latter including an impulse sending means and a circuit therefor, and means for disabling and restoring the associated means when the impulse sending means has been disconnected from the called or wanted subscriber's station and line.

30. In a telephone exchange system the combination of a calling subscriber's line provided with impulse sending means, an operator's position, a trunk line adapted to be connected to the calling subscriber's line and terminating at the operator's position, other subscribers' lines and stations, a suitable control circuit adapted to cause the interconnection of the calling subscriber's line with said other lines, means for connecting the calling subscriber's line and station to said operator's position upon the origination of a call and upon the failure of the calling subscriber to operate the sending device at his station, and means for signaling the wanted or called line and station and for supervising the calling line from said operator's position while the impulses are being transmitted.

31. In a telephone exchange system, the combination with a calling and a called subscriber's station equipped with sending means, automatic switching mechanism responsive to said sending means for interconnecting said stations, an operator's position, means for connecting the calling subscriber's station to said position upon the origination of a call and of a failure to operate the sending means at said station, and additional means under control of the operator for interconnecting said lines by means of said switching mechanism which is responsive to said sending means.

32. In a telephone exchange system, the combination with a calling and a called subscriber's station equipped with sending means, automatic switching mechanism responsive to said sending means for interconnecting said stations, an operator's position, means for connecting the calling station to said position upon the origination of a call and of a failure to operate the sending means at said station, and additional means under control of the operator for thereafter interconnecting said lines by said switching mechanism.

In testimony whereof I affix my signature in presence of two witnesses.

WALTER P. ALBERT.

Witnesses:
JAMES D. BONNAR,
E. S. DOWNS.